United States Patent Office
3,825,607
Patented July 23, 1974

---

3,825,607
SYNTHESIS OF 1-BROMO-TRANS-3, TRANS-5-HEPTADIENE
Charles E. Descoins and Clive A. Henrick, Palo Alto, Calif., assignors to Zoecon Corporation, Palo Alto, Calif.
No Drawing. Filed Jan. 17, 1972, Ser. No. 218,512
Int. Cl. C07c 21/14
U.S. Cl. 260—654 R                               1 Claim

---

ABSTRACT OF THE DISCLOSURE

1-Halo-3,5-heptadiene, prepared by the action of aqueous hydrohalic acid on 1-cyclopropyl-2-buten-1-ol which may be prepared by a Grignard reaction between crotonaldehyde and cyclopropyl magnesium halide or between cyclopropyl cyanide and 1-propynyl magnesium halide. It is useful in preparing 8,10-dodecadienol, a known codling moth sex attractant.

---

This invention relates to 8,10-dodecadien-1-ol, and is particularly concerned with pure, crystalline trans-8, trans-10-dodecadien-1-ol and to novel methods for its preparation. This invention further relates to certain novel intermediates useful in the preparation of trans-8, trans-10-dodecadien-1-ol and methods for their preparation.

Trans-8, trans-10-dodecadien-1-ol having the structure

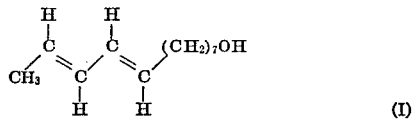

(I)

is useful for entomological research on the identification of sex pheromone and on the habits, sex response and control of codling moth. It is a sex attractant for the male codling moth (Science, *174*, 297 (1971). Thus, it may be useful in sex attractant traps for the suppression of codling moths and therefore have great commercial implications in pest control. Codling moths have long been considered a major pest of apple orchards. Use of sex attractant and/or sex pheromone traps is a desirable method of control of pests since such control could reduce greatly the large use of insecticide sprays which are toxic to human beings and animals as well as to the insects intended to be controlled.

Although trans-8, trans-10-dodecadien-1-ol has been reported (Science, supra), it has not been obtained in a pure, crystalline form. Moreover, a method for preparing the compound in a pure crystalline form substantially free of the cis,trans isomer is not known. It is highly desirable to have a compound in a pure crystalline form, and further to be able to prepare it in a single isomeric form without the necessity of isomerization and/or isomer separation.

According to the present invention, it has been discovered that trans-8, trans-10-dodecadien-1-ol may be prepared in a crystalline form. Moreover, for the first time, it has been prepared substantially as the sole product in a stereospecific synthesis. Since it may be obtained substantially free of cis-trans, trans-cis, and cis-cis isomers, the necessity for isomerization and/or cumbersome isolation is avoided.

Crystalline trans-8, trans-10-dodecadien-1-ol substantially free of stereoisomers may be prepared by a cross-coupling reaction in which an aliphatic halide in the form of a Grignard reagent is coupled with another aliphatic halide in the presence of copper (I) catalyst in an inert atmosphere. The aliphatic halide compounds to be coupled are 1-halo-trans-3, trans-5-heptadiene and 5-halo-1-pentanol. Either of the compounds may be the Grignard reagent component. Although the halo group may be iodo, bromo or chloro, the chloro compounds are preferred. In 5-halo-1-pentanol, it is necessary to protect the functional hydroxyl group for the coupling step; the initial coupling product, therefore, has the formula

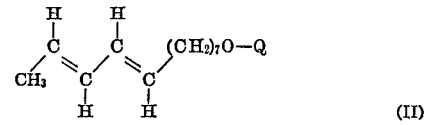

(II)

wherein, "Q" represents an ether forming protecting group. Suitable protecting groups include tetrahydropyranyl, tetrahydrofuranyl, trimethylsilyl, triethylsilyl, triphenylsilyl, triphenylmethyl, benzyl, diphenylmethyl, t-butyl, etc. The protecting group forms an ether linkage and the product represented by Formula II will hereinafter be referred to as the "ether coupling product." It is to be understood that the ether linkage may be acetal in nature, such as in the tetrahydropyranyl and tetrahydrofuranyl ethers. The ether coupling product is then hydrolyzed to remove the protecting group, Q, and to obtain the desired trans-8, trans-10-dodecadien-1-ol.

Thus, in one method, 1-halo-trans-3, trans-5-heptadiene (Formula III) may be contacted with the Grignard reagent of a protected 5-halo-1-pentanol (Formula IV) in the presence of copper (I) catalysts to obtain the ether coupling product, which is thereafter hydrolyzed according to the following equation:

(1)

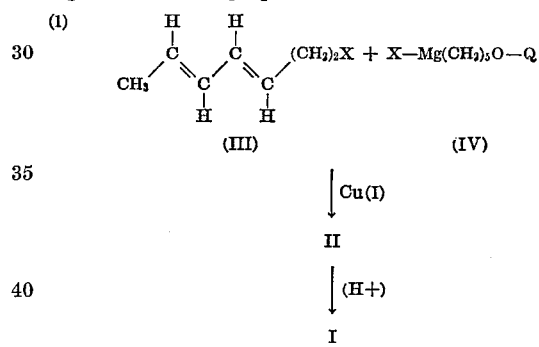

In the foregoing and subsequent formulas, "X" represents a halo group as previously defined.

Alternatively, the Grignard reagent of 1-halo-trans-3-trans-5-heptadiene may be contacted with a protected 5-halo-1-pentanol in the presence of copper (I) catalyst to obtain an ether coupling product, which is thereafter hydrolyzed according to the following equation:

(2)

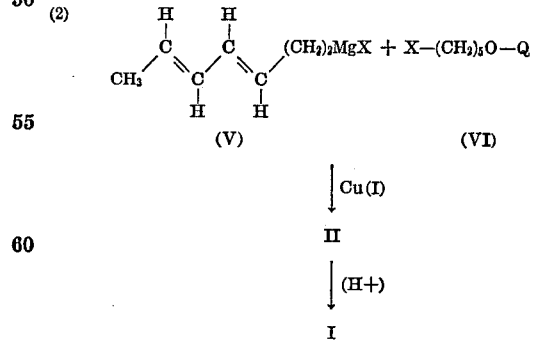

In the coupling reactions, the exact amounts of the reactants are not critical but substantially equimolar amounts should be employed to avoid homo-coupling side reactions.

The cross-coupling reaction is catalyzed by copper (I) catalyst and can be made to take place in an ethereal medium at temperatures of from about −20° to about 5° C., preferably about −5° to 0° C. One catalyst which can be used is as a dilithium tetrachlorocuprate solution in tetrahydrofuran. A dilithium tetrachlorocuprate solution may be prepared from lithium chloride and copper (II) chloride in 2:1 mole ratio as described by Tamura et al., Synthesis, July, 1971, page 303. Other copper salts can be used to generate the copper catalyst. Typical copper salts useful in the present invention include copper acetate, cuprous acetate, cuprous iodide, cuprous chloride, cuprous bromide and cupric halides.

By the expression "ether," "an ether solvent" or "an ethereal medium," as employed throughout the application, is meant ether in a generic sense and includes diethyl ether, diisopropyl ether, tetrahydropyran, tetrahydrofuran, di-n-propyl ether and mixtures thereof, such as diethyl ether and tetrahydrofuran. The choice may be governed by practical considerations, such as usefulness for reaction temperature control, suitability for use in subsequent steps, etc. Tetrahydrofuran is the solvent of choice for the coupling step in the presence of Cu(I) catalyst since it minimizes disproportionation and homo-coupling side reactions. Thus, tetrahydrofuran also becomes a preferred solvent in the preparation of the Grignard reagent to be used in the coupling step.

In carrying out a procedure according to either Equation 1 or Equation 2, a small amount of a copper salt, such as dilithium tetrachlorocuprate solution, is added to a cooled ethereal reaction medium containing one of the halides together with a Grignard reagent made from the other halide and maintained in an inert atmosphere. The inert atmosphere may be provided by flushing the reaction vessel with nitrogen or argon. The temperature during the addition is in the range of from about $-20°$ C. to about $5°$ C. After completion of the addition, cooling and stirring are continued for several hours, generally three to four hours to complete the reaction with the formation of the ether coupling product represented by Formula II. The reaction mixture may be stored overnight if maintained at temperatures near $-10°$ to $0°$ C. The ether coupling product is then recovered from the reaction mixture by conventional procedures.

Conventional procedures to be employed for recovering the above ether coupling product or other products of Grignard syntheses hereinafter to be described, may be summarized briefly as follows: The reaction mixture is treated with aqueous ammonium chloride solution, the resulting heterogeneous mixture is extracted with a water-immiscible organic solvent to recover the product therein, the organic solution is washed and dried, then the solvent is vaporized off and the product distilled. Treatment with aqueous ammonium chloride frees the product and ether solvent from metal complexes and/or unreacted reagent. When the Grignard reaction is an addition reaction, it is necessary for the release of the product from the metal addition complex. Aqueous ammonium chloride is employed rather than strong acids for the reason that the latter may promote isomerization, ether cleavage, and other undesirable side reactions. In another procedure, the reaction mixture is treated slowly with saturated aqueous ammonium chloride, with stirring, until precipitate granulates whereupon the mixture is filtered and the filtrate evaporated to isolate the product.

The Grignard reagents employed in the foregoing and subsequent syntheses may be prepared from substantially equimolar proportions of an appropriate alkyl halide and magnesium in an ethereal medium by conventional methods as hereinafter described. Generally, the reaction is initiated at room temperature (about $20°$ C.) by adding to magnesium in an ethereal solution, a crystal of iodine and a small amount of the appropriate alkyl halide. The remaining alkyl halide is added and the reaction mixture maintained at temperatures in the range of about $45°$ to $80°$ C. until all the magnesium has reacted. This may be accomplished conveniently by maintaining gentle reflux of the ethereal solvent.

Thus, a Grignard reagent represented by Formula IV may be prepared in this manner from an alkyl halide represented by Formula VI; similarly, a Grignard reagent represented by Formula V may be prepared from an alkyl halide represented by Formula III.

In a preferred method for carrying out the synthesis of trans-8, trans-10-dodecadien-1-ol according to Equation 1, a Grignard reagent represented by the formula $$Q\text{—}O(CH_2)_5MgCl$$

is first prepared by contacting magnesium turnings and $Q\text{—}O(CH_2)_5Cl$ in an ethereal solvent in a manner described above. Tetrahydrofuran is the solvent of choice since it permits temperature control by refluxing and further, it is the preferred solvent in the subsequent coupling step.

The Grignard reagent, $Q\text{—}O(CH_2)_5MgCl$, thus prepared and 1-halo-trans-3, trans-5-heptadiene then are mixed together in substantially equimolar amounts in an inert atmosphere in a cooled tetrahydrofuran reaction medium and a catalytic amount of a copper salt, such as dilithium tetrachlorocuprate solution, is added thereto with cooling to maintain the temperature about $-10°$ to $0°$ C. The amount of copper salt solution employed is not critical. As little as about 1 to 3 millimoles of catalyst per mole of one of the reactants is sufficient. Larger amounts of catalyst can be used also. After completion of the addition, the reaction mixture is stirred for several hours, such as two to about twenty-four hours at about $0°$ C. to complete the formation of the ether coupling product of trans-8, trans-10-dodecadien-1-ol represented by Formula II.

The ether coupling product may be recovered from the reaction mixture by contacting the reaction mixture with saturated ammonium chloride solution, thereafter, filtering or extracting the product therefrom with water-immiscible solvent, washing, drying and distilling the extract as previously described. Any suitable modification of the work-up procedure familiar to the skilled in the art may be employed. Thus, in treating with ammonium chloride solution, the reaction mixture may be mixed at once with a large amount (1 to 1.5 times the volume) of aqueous ammonium chloride solution, or it may be diluted with an ethereal solvent to increase the volume of the ethereal solution by about one-third and thereafter adding dropwise and with stirring a minimal amount (⅕ to ¼ the volume) of ammonium chloride solution.

In a preferred method for carrying out the synthesis of trans-8, trans-10-dodecadien-1-ol according to Equation 2, trans-3-trans-5-heptadien-1-yl magnesium chloride (a Grignard reagent represented by Formula V) is first prepared by contacting magnesium and 1-chloro-trans-3, trans-5-heptadiene in ethereal solvent in a manner previously described. Again, tetrahydrofuran is the solvent of choice for reasons previously discussed.

The Grignard reagent thus prepared and $$X(CH_2)_5O\text{—}Q$$

are then mixed together in an inert atmosphere in a cooled tetrahydrofuran reaction medium and a small amount of copper salt, such as dilithium tetrachlorocuprate (prepared as previously described) is added thereto with cooling to maintain the temperature near $-10°$ to $0°$ C. Stirring is continued for several hours at this temperature whereupon an ether coupling product represented by Formula II is obtained. The coupling product is recovered from the reaction mixture in a manner previously described. The ether coupling product is the same product as that obtained by the reaction between the Grignard reagent (IV) and 1-bromo-trans-3, trans-5-heptadiene.

In carrying out the hydrolysis of the ether coupling product (II), the latter is intimately contacted with a hydrolyzing agent whereupon the protecting group Q is replaced by hydrogen and the desired trans-8, trans-10-dodecadien-1-ol product is obtained. The nature of the hydrolyzing agent and the conditions for hydrolysis depend on the nature of the protecting group but, generally, the mildest possible conditions are desirable to protect the trans,trans stereochemistry. Hydrolyzing agents may be water or dilute aqueous or alcoholic solutions of acids, such as p-toluenesulfonic acid, sulfuric acid, hydrochloric acid, hydrobromic acid, nitric acid, acetic acid, perchloric acid, etc. When the protecting group is a completely organic ether or acetal group, from about 0.2 to about 2.5 moles of acid per mole of ether may be intimately mixed with the ether coupling product in aqueous ethanol or other alcohol or aqueous tetrahydrofuran for from about two to four hours at temperatures ranging from 20° C. to about 50° C. Under these acidic conditions, it is preferable to employ lower temperatures and larger ratio of acid to water alcohol than to use elevated temperatures and a smaller amount of acid. When the protecting group is a silyl group, such as trimethylsilyl, the protecting group may be removed by merely boiling for several minutes with a small amount of water with sufficient alcohol to give a homogeneous solution as described in J. Am. Chem. Soc., 74, 3024 (1952). In the absence of acid, elevated temperatures may be used.

The 1-halo-trans-3, trans-5-heptadiene to be employed in the coupling reaction is a novel compound and may be prepared unexpectedly substantially free of other geometric isomers by a novel method. The novel method comprises contacting 1-cyclopropyl-trans-2-buten-1-ol or 1-cyclopropyl-trans-1-buten-3-ol with a molar excess of, for example, aqueous hydrobromic acid such as 48% hydrobromic acid or aqueous hydrochloric acid in an inert atmosphere and at temperatures of from about —10° C. to 10° C. whereupon a reaction takes place with the formation of the desired 1-halo-trans-3, trans-5-heptadiene according to the following equation:

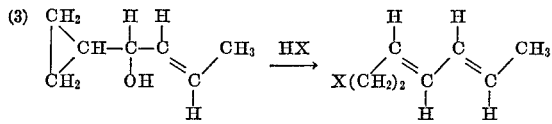

It is wholly unexpected that 1-halo-3,5-heptadiene should be obtained as the trans,trans isomer substantially free of the cis,trans or other isomers. The obtaining of stereospecific 1-halo-trans-3, trans-5-heptadiene provides for a novel and useful synthetic method for the preparation of trans-8, trans-10-dodecadien-1-ol.

In carrying out this reaction, a novel compound, 1-cyclopropyl-trans-2-buten-1-ol, prepared as hereinafter described, is poured in a single addition to an aqueous solution of hydrobromic acid which has been cooled to about —10° C. to 0° C. and contained in a reaction vessel which previously had been flushed out with nitrogen or argon to maintain an inert atmoshpere. The amount of acid to be employed is 3- to 5-fold excess on a molar basis and commercially available 48% hydrobromic acid is conveniently employed. On addition of 1-cyclopropyl-trans-2-buten-1-ol to the acid, heat is evolved and the resultant mixture remains in two phases. Efficient stirring and cooling are necessary to provide thorough contact of the phases and to maintain the temperature below about 10° C. A reaction occurs quickly with the evolution of heat and is usually complete in from about 15 to 30 minutes. It is desirable to continue the stirring for 10 to 20 minutes after noticeable evolution of heat has ceased. After completion of the stirring, the organic phase is decanted off, the aqueous acidic phase extracted with a water-immiscible solvent, the organic solutions combined and washed with water, aqueous sodium bicarbonate and brine and dried. Preferred water-immiscible solvents for extracting are hydrocarbon solvents, such as n-pentane, n-hexane, n-heptane, benzene, toluene, etc. The dried solution is then distilled to obtain the desired 1-bromo-trans-3, trans-5-heptadiene intermediate. The trans,trans nature of the compound was established by spectroscopic analysis.

The novel 1-cyclopropyl-trans-2-buten-1-ol employed in the foregoing synthesis of 1-bromo-trans-3, trans-5-heptadiene and useful as an intermediate in the synthesis of trans-8, trans-10-dodecadien-1-ol may be prepared from readily available starting materials. Two particularly suitable approaches are summarized in the following equations:

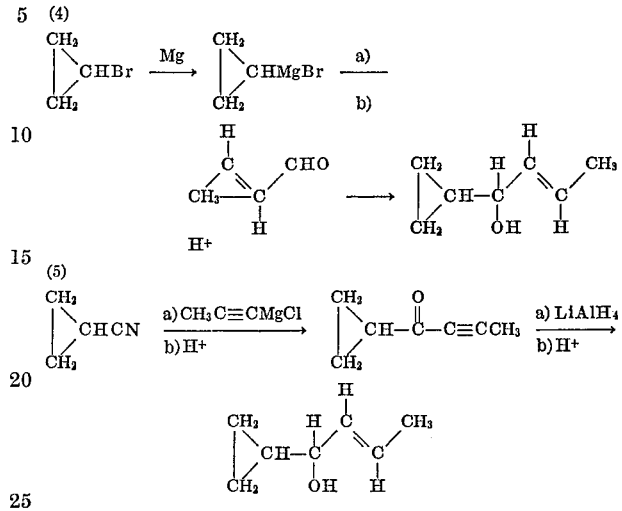

The reaction according to Equation 4 contemplates preparing a Grignard reagent of cyclopropyl bromide and employing the Grignard reagent with a reaction with crotonaldehyde to obtain the desired 1-cyclopropyl-trans-2-buten-1-ol.

In carrying out the reaction, the Grignard reagent of cyclopropyl bromide is prepared as the first step. It may be prepared in a conventional manner by contacting together magnesium and cyclopropyl bromide in dry ethereal solution at temperatures of from about 50° C. to about 80° C. as prevously described. The Grignard reagent thus prepared in ethereal solvent is cooled to very low temperatures (about —20° C.). Thereafter, an ethereal solution of a substantially equimolar amount of crotonaldehyde is added dropwise thereto over a period of about 15 to 60 minutes. After completion of the addition, the reaction mixture is allowed to warm to 0° C. and is maintained at this temperature from one to three hours to complete the reaction with the formation of a 1-cyclopropyl-trans-2-buten-1-ol compound which remains in solution in the form of an addition product complex. The desired 1-cyclopropyl-trans-2-buten-1-ol is freed from the complex with ammonium chloride solution and recovered by conventional procedures as previously described. The trans configuration at the ethylenic double bond was established by infra red spectral data.

The reaction according to Equation 5 contemplates reacting cyclopropyl cyanide with the Grignard reagent of 1-propynyl chloride to obtain 1-cyclopropyl-2-butyn-1-one (or 1-propynyl cyclopropyl ketone) which is then reduced at the carbonyl and the triple bond to the desired 1-cyclopropyl-2-buten-1-ol.

In carrying out the reaction, an ethereal solution of cyclopropyl cyanide is added dropwise with stirring under anhydrous conditions to an ethereal solution of a substantially equimolar amount of 1-propynyl magnesium chloride Grignard reagent. After completion of the addition, the reaction mixture is heated in the temperature range of from about 50° C. to about 80° C. for from about 8 to 12 hours to complete the reaction with the formation of a cyclopropyl-2-butyn-1-one Grignard addition product which remains in the solution as a complex. The complex is hydrolyzed with ammonium chloride solution as previously described and the ketone is extracted from the hydrolysis mixture with an ether solvent. The ketone may be purified by treating a concentrated ethereal solution thereof with aqueous 10% sulfuric acid at moderate temperatures (40°–60° C.) for several hours. It is then recovered by conventional procedures, such as extracting, washing the extract, drying and distilling to recover as distillate a purified 1-cyclopropyl-2-butyn-1-one intermediate.

The 1 - cyclopropyl - 2 - butyn - 1 - one may be reduced to the desired 1-cyclopropyl - 2 - buten-1-ol by adding an ethereal solution of an excess amount of a metal hydride reducing agent, such as lithium aluminum hydride, and heating the reaction mixture in the temperature range of about 50° to 80° C. for from 3 to 12 hours whereupon the alcohol reduction product is formed which remains in solution as a complex. The alcohol may be recovered from the reduction product complex by conventional procedures similar to recovery of Grignard reaction products, such as by dissolving the reaction mixture in ether solvent, hydrolyzing the product complex with aqueous ammonium chloride, washing the ether solution drying and distilling. The 1-cyclopropyl - 2 - buten-1-ol product obtained by this procedure has the same properties as that shown by the 1-cyclopropyl-2-buten-1-ol obtained by the Grignard addition of cyclopropyl magnesium chloride and crotonaldehyde. Thus, the product is 1 - cyclopropyl-trans-2-buten-1-ol.

The 1-propynyl magnesium chloride Grignard reagent employed in the above reaction with cyclopropyl cyanide may be prepared by bubbling dry propyne through a solution of commercial ethyl magnesium chloride in dry ethereal solvent, cooled to temperatures of from −10° to 0° C. for about two to six hours, thereafter, warming the mixture for one-half to two hours (conveniently under reflux) to drive off the ethane by-product and then cooling to obtain the Grignard reagent.

The protected 5-halo-1-pentanol, $X(CH_2)_5O$—Q, to be employed in the coupling reactions previously described (Equations 1 and 2), may be prepared by conventional methods, such as by contacting a 5-halo-1-pentanol with a compound which forms an ether or acetal with the 5-halo-1-pentanol. In selecting a suitable protecting group, the ease of removal of Q from the coupled product and the inertness of Q to a Grignard reagent must be considered. Particularly suitable protecting groups include certain groups forming acetal-type linkage, such as tetrahydrofuranyl and tetrahydropyranyl, and certain silyl groups, such as trimethylsilyl, triethylsilyl, etc. Other protecting groups, such as triphenylmethyl, diphenylmethyl, benzyl, t-butyl, etc., are also suitable but are less desirable merely from the standpoint that indirect methods may have to be employed for their preparation rather than a direct synthesis from the corresponding halo alcohol $X(CH_2)_5OH$.

The actual conditions for carrying out the preparation of $X(CH_2)_5O$—Q are dictated by the nature of the protecting group Q.

When Q is tetrahydrofuranyl or tetrahydropyranyl, the compound may be prepared by contacting 5 - halo-1-pentanol with dihydrofuran or dihydropyran in the presence of an acid catalyst. When Q is trialkylsilyl or triphenylsilyl, the compound may be prepared by contacting 5-halo-1-pentanol with trialkylchlorosilane or triphenylchlorosilane in the presence of pyridine or other nitrogen base, or with hexaalkyldisilazane or hexaphenyldisilazane.

In carrying out the reaction when Q is furanyl or pyranyl, 5 - halo - 1 - pentanol is contacted with dihydrofuran or dihydropyran in the presence of a catalytic amount of a strong acid. Suitable strong acids include hydrochloric acid, p-toluenesulfonic acid, sulfuric acid, methanesulfonic acid, etc. A drop of concentrated acid solution or a crystal of solid acid is generally sufficient although as much as 2 milliliters have been employed in a successful synthesis. A large amount would cause hydrolysis of the heterocyclic ring with resultant decrease in yield and, therefore, should be avoided. The exact amounts of the reactants are not critical but a slight excess of dihydrofuran or dihydropyran, generally from 1.1 to 1.5 moles of the heterocyclic compound per mole of bromo alcohol is considered satisfactory. The order of addition may also be varied. The preferred methods are hereinafter described.

One method may be illustrated in the preparation of the compound, 2 - (5′ - bromo - 1′ - pentyloxy)tetrahydropyran, for the coupling reaction. This compound may be prepared by the reaction of 5-bromo-1-pentanol and dihydropyran in the presence of a strong acid according to the following equation:

(6) 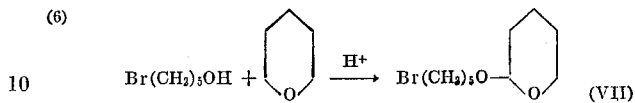 (VII)

The reaction may be carried out by the portionwise addition of a slight molar excess of dihydropyran to a cooled, stirred mixture of 5-bromo-1-pentanol and a small amount of concentrate hydrochloric acid. The reaction which takes place with the formation of 2-(5′-bromo-1′-pentyloxy)tetrahydropyran is exothermic and it is necessary to exercise precaution to maintain the temperature of the reaction mixture in the range of from about −5° C. to about 20° C. After completion of the addition, stirring may be continued for several hours to ensure completion of the reaction to obtain 2-(5′-bromo-1′-pentyloxy)tetrahydropyran. The product may be recovered by conventional methods, such as adding anhydrous potassium carbonate to neutralize the acid, dissolving the product in a water-immiscible organic solvent, washing the organic solution with alkali and brine and drying and distilling.

Purified 2-(5′-bromo-1′-pentyloxy)tetrahydropyran obtained by the above described procedures is suitable for use in the coupling reaction.

In carrying out the reaction when Q is trialkylsilyl, 5-halo-1-pentanol may be intimately contacted with an equimolar portion of trialkylchlorosilane under anhydrous conditions while cooling in an ice-bath in the presence of a hydrogen chloride acceptor, such as pyridine, quinoline, ammonia, etc., with the formation of 5-halo-1-pentyloxytrialkylsilane. When pyridine or other liquid nitrogen compound is employed as hydrogen chloride acceptor, an excess is employed so that it may function as a solvent. If ammonia is used as hydrogen chloride acceptor, an inert solvent, such as benzene, is employed and dry ammonia is passed through the reaction mixture. It is critical and essential that anhydrous conditions be employed since the trialkylsilyl group is readily hydrolyzed.

Alternatively, hexaalkyldisilazane may be added to a cooled 5-halo-1-pentanol while the reaction mixture is kept below about 20° C. with trimethylchlorosilane as catalyst. A reaction takes place with the formation of 5-halo-1-pentyloxytrialkylsilane and ammonia.

5-Chloropentyloxytrimethylsilane is the preferred of the trialkylsilyl protected 5-halo-1-pentanols and may be prepared according to the following equation:

(7) 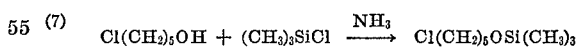

In carrying out the reaction, the 5-chloropentyloxytrimethylsilane may be prepared by stirring together while cooling substantially equimolar amounts of trimethylchlorosilane and 5-chloro-1-pentanol in anhydrous benzene while passing gaseous ammonia therethrough until the odor of ammonia persists. The ammonium chloride by-product may be filtered off and the filtrate distilled to recover first the solvent and then the 5-bromopentyloxytrimethylsilane. 5-Chloropentyloxytrimethylsilane is suitable for use in the coupling reactions.

Further modifications for the preparation of trialkylsilyl derivatives of hydroxy compounds which are adaptable to the present process may be seen in J. Am. Chem. Soc. 74, 1003 (1952) and J. Am. Chem. Soc. 74, 3024 (1952).

The 5-halo-1-pentanol to be employed in the above synthesis may be prepared from readily available starting materials employing any method familiar to those skilled in the art. Two particularly useful approaches proceed by reactions which may be summarized by the following equations:

(8) 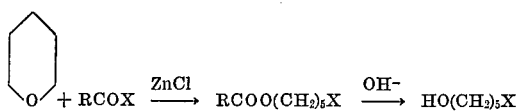

(9) 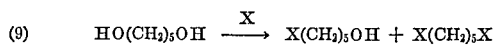

The reaction according to Equation 8 contemplates formation of an ester of 5-halo-1-pentanol by the reaction of an acyl halide with tetrahydropyran in the presence of an acid catalyst followed by alkaline hydrolysis of the acyl group. The exact amount of reactants is not critical but excess acyl halide, generally about 1.5 moles of acyl halide for each mole of tetrahydropyran is suitable. Although a number of acyl halides may be employed, acetyl chloride and acetyl bromide are convenient. The preferred catalyst is zinc chloride although other Lewis acids, such as boron trifluoride, aluminum chloride, ferric chloride, hydrogen chloride, zinc bromide, ferric bromide, etc., may be employed.

In carrying out the reaction, acyl halide is added dropwise to a mixture of dry tetrahydropyran which has dissolved therein, a catalytic amount of anhydrous zinc chloride or other Lewis acid. The reaction is very exothermic and addition is made at a rate to maintain gentle reflux. After completion of the addition, the mixture is heated at a temperature in the range of from 75° to 85° C. for from one to three hours to obtain a 1-acetoxy-5-halopentane product. The reaction mixture is then dissolved in benzene or other water-immiscible solvent, the benzene solution is washed successively with water, bicarbonate and brine, then dried and subjected to reduced pressure to vaporize off the solvent and then distilled to obtain purified 1-acetoxy-5-halopentane. A minor amount of 1,5-dihalopentane is normally present as a by-product. Very pure 1-acetoxy-5-halopentane substantially free of the dihalide may be obtained by distilling through a spinning band column.

The 1-acetoxy-5-halopentane thus prepared is stirred together with approximately equivalent amount of dilute alkali in an alcoholic solvent at room temperature for from about 12 to 50 hours to obtain a 5-halo-1-pentanol. The latter may be recovered from the reaction mixture by distilling off the alcohol solvent, extracting 5-halo-1-pentanol from the residue with benzene or other water-immiscible solvent, then employing conventional procedures of washing, drying and distilling.

The reaction according to Equation 9 is a monohalogenation of $HO(CH_2)_5OH$ with ⅓ mole equivalent of phosphorous trihalide, such as phosphorous tribromide or phosphorous trichloride, to obtain 5-halo-1-pentanol. There is always obtained 1,5-dihalopentane as by-product in sufficient quantities to require a separation step. However, this may be readily accomplished. A preferred procedure is separation by chromatography.

In carrying out the reaction, ⅓ mole equivalent of phosphorous trihalide is added dropwise with stirring to a solution of 1,5-pentanediol in an inert solvent, such as benzene. The reaction is exothermic and the rate of addition may be such to maintain gentle reflux of the solvent. After completion of the addition, the reaction mixture is heated in the temperature range of from about 70° C. to 90° C. for from two to four hours and further may be kept overnight at room temperature. As a result of these operations, 5-halo-1-pentanol and 1,5-dihalopentane are obtained. These products may be recovered from the reaction mixture by pouring the mixture into water, decanting off the organic phase and washing it with alkali and water until neutral, and then drying, vaporizing and distilling in a conventional manner.

5-Halo-1-pentanol and 1,5-dihalopentane may be separated by chromatography. The mixture may be absorbed on such absorbing materials as neutral alumina, magnesia-silica gel (Florisil) and silica gel. The halo alcohol and the dihalide may then be separated by appropriate eluting agents. The exact eluting agents vary with the absorbent employed. Generally, a non-polar agent is employed first to selectively remove the dihalide and is followed by an eluting agent which contains a polar solvent to remove the halo alcohol. Thus, the mixture may be separated by eluting first with a hydrocarbon, such as hexane or heptane, to remove the dihalide and then with an eluting agent containing an alcohol, such as methanol or ethanol, to remove the halo alcohol. When neutral alumina is the absorbent, a suitable combination of eluting agents are hexane and 10% methanol in diethyl ether. When magnesia-silica gel is the absorbent, a suitable combination of eluting agents are hexane and 30% ethanol in hexane.

Especially useful methods for preparing trans-8, trans-10-dodecadien-1-ol employing reactions which include the steps of preparing the novel intermediates are hereinafter summarized.

According to one methods, trans-8, trans-10-dodecadien-1-ol may be prepared by (1) adding crotonaldehyde to cyclopropyl magnesium bromide to obtain an addition product complex, thereafter contacting the addition product complex with ammonium chloride solution to obtain 1-cyclopropyl-trans-2-buten-1-ol, (2) intimately contacting the latter with aqueous hydrobromic acid or hydrochloric acid in an inert atmosphere at temperatures in the range of from about −10° C. to +10° C. to obtain 1-halo-trans-3, trans-5-heptadiene, (3) contacting in the presence of Cu(I) catalyst the 1-halo-trans-3, trans-5-heptadiene with the Grignard reagent of 2-(5'-halo-1'-pentyloxy)tetrahydropyran having the formula

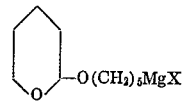
(VIII)

to obtain an ether coupling product having the formula

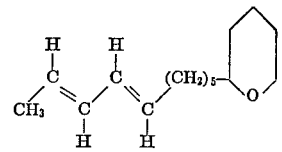
(IX)

and then (4) contacting the ether coupling product with an acidic hydrolytic agent.

According to another method, the trans-8, trans-10-dodecadien-1-ol may be prepared by a process wherein the first two steps are identical to the foregoing process but as step (3), the 1-halo-trans-3, trans-5-heptadiene is converted to a Grignard reagent by adding it to an ethereal medium containing magnesium turnings to obtain trans-3, trans-5-heptadien-1-yl magnesium halide Grignard reagent (Formula V), then (4) contacting in the presence of Cu(I) catalyst to obtain the same ether coupling product as the previous method (Formula IX), then (5) contacting the ether coupling product with an acid hydrolytic agent.

According to still another method, the trans-8, trans-10-dodecadien-1-ol may be prepared by a process which employs the alternate synthesis of the intermediate 1-halo-trans-3, trans-5-heptadiene. As step (1), propyne and ethyl magnesiumchloride are contacted to obtain 1-propynyl magnesium chloride, then (2) cyclopropyl cyanide is added to it to obtain an addition complex which, when hydrolyzed with ammonium chloride, give 1-cyclopropyl-2-butyn-1-one, which (3) when then contacted with a metal hydride reducing agent, forms a reduction product complex which can be hydrolyzed to 1-cyclopropyl-trans-2-buten-1-ol, which (4) when contacted in turn with aqueous hydrobromic acid or hydrochloric acid at temperatures from −10° C. to 10° C. in an inert atmosphere, produces 1-halo-trans-3-trans-5-heptadiene which (5) when contacted with Grignard reagent of 2-(5'-halo-1'-pentyloxy) tetrahydropyran (Formula VIII), produces the ether coupling product (Formula IX) which (6) then may be hydrolyzed to the desired trans-8, trans-10-dodecadien-1-ol.

According to still another method, the trans-8, trans-10-10-dodecadien-1-ol may be prepared by a process wherein the first four steps are identical to the immediately preceding process but as step (5), the 1-halo-trans-3, trans-5-heptadiene is added to an ethereal medium containing magnesium turnings to obtain the Grignard reagent, trans-3, trans-5-heptadien-1-yl magnesium halide (Formula V), when then (6) is contacted with 2-(5'-halo-1'-pentyloxy) tetrahydropyran (Formula VII) in the presence of Cu(I) catalyst to obtain the ether coupling product (Formula IX), which (7) is contacted with an acidic hydrolytic agent.

The following examples illustrated the invention but are not to be construed as limiting.

EXAMPLE 1

5-bromo-1-pentanol

160 Grams (1.3 mole) of acetyl bromide was added dropwise to a solution of 2 g. of anhydrous zinc chloride in 75.5 g. (0.87 mole) of tetrahydropyran whereupon an exothermic reaction took place with the formation of a 5-bromo-1-acetoxypentane intermediate. After completion of the addition, the reaction mixture was heated at about 80° C. for 2 hours to complete the reaction and thereafter was cooled and diluted with 500 ml. of benzene. The benzene solution was washed successively with three 500-milliliter portions of water and two 250-milliliter portions of each of sodium bicarbonate solution and brine, and then dried over anhydrous magnesium sulfate. Thereafter, the benzene was vaporized off and the reddish residue was distilled to obtain 170 g. (96% yield) of purified 5-bromo-1-acetoxypentane. 5 - Bromo-1-acetoxypentane when distilled employing a spinning band column had a boiling point of 69°–70° C. at 3 mm. of Hg pressure.

60 Grams (0.3 mole) of the 5-bromo-1-acetoxypentane was dissolved in 125 ml. of absolute alcohol and was stirred together with 160 ml. of 2N sodium hydroxide for 2 days at room temperature to obtain a 5-bromo-1-pentanol compound. The latter was recovered from the reaction mixture by (1) vaporizing off the alcohol, (2) extracting the residue with three 100-milliliter portions of benzene, (3) washing the benzene extract with two 100-milliliter portions of brine, (4) drying the extract over magnesium sulfate, (5) vaporizing off the benzene and (6) distilling the residue under reduced pressure. A purified 5-bromo-1-pentanol product, b.p. 67°–68° C. at 0.3 mm. of Hg pressure, was obtained in a yield of 30 g. (60% of theory).

EXAMPLE 2

5-bromo-1-pentanol 61.3 milliliter (⅓ mole equivalent) of phosphorous tribromide was added dropwise to a stirred solution of 200 g. (1.9 mole) of 1.5-pentanediol in 500 ml. of dry benzene. The mixture then was heated under reflux for 3 hours and allowed to stand overnight at room temperature. The reaction mixture was then poured into 1000 ml. of water, and the benzene solution decanted off and washed successively with two and three 500-milliliter portions of 10% sodium hydroxide and water, respectively until neutral, and dried over magnesium sulfate. The benzene was vaporized off under reduced pressure and the colorless residue distilled to obtain 214.4 g. of a mixture of a 5-bromo-1-pentanol product and a 1,5 - dibromopentane by-product which boiled over the temperature range of 55° to 55° C. at 0.1 mm. of Hg pressure. The two components were separated by chromatography by adsorbing the mixture on 1500 grams of neutral alumina adsorbent and eluting first with 3000 ml. of hexane to recover 120 g. of 1,5-dibromopentane by-product and then with 1500 ml. of 9:1 ether-methanol to recover 90 g. of the desired 5-bromopentanol product. The latter was distilled to obtain 80 g. of purified 5-bromo-1-pentanol product having properties similar to the 5-bromo-1-pentanol prepared as described in Example 1.

EXAMPLE 3

5-bromo-1-pentanol

In a manner similar to that described in Example 2, 174 g. (0.642 mole) of phosphorous tribromide was added over a two hour period to 200 g. (1.9 moles) of 1,5-pentanediol in 500 ml. of dry benzene. Thereafter, the mixture was stirred at reflux temperature for 3 hours and at room temperature overnight. The resulting mixture was washed with brine and with sodium bicarbonate solution and dried over calcium sulfate. The benzene solvent was then vaporized off to obtain 209.9 g. of a mixture of 5-bromo-1-pentanol product and 1,5-dibromopentane by-product. The mixture was separated by adsorbing on 1 kg. of magnesia-silica gel adsorbent. (Florisil) and eluting successively with hexane and 30% ethanol in hexane. As a result of these operations, 75 g. of the desired 5-bromo-1-pentanol product of 99.3% purity (as determined by gas-liquid chromatography (GLC)) was recovered primarily from the ethanol-hexane eluant.

EXAMPLE 4

2-(5-bromo-1-pentyloxy) tetrahydropyran 18 grams (0.21 mole) of dihydropyran was added slowly in 2 milliliter portions to a stirred mixture of 30 g. (0.18 mole) of 5-bromo-1-pentanol and 10 drops of concentrated hydrochloric acid while maintaining the reaction mixture below 20° C. After completion of the addition, the mixture was stirred for 2 hours at room temperature to complete the reaction and then diluted with 200 ml. of ethyl ether. The ether solution was washed successively with two 100 milliliter portions of each of 2N sodium hydroxide and brine, then dried over magnesium sulfate. Thereafter, the ether was vaporized off and the residue distilled to obtain the 2-(5' - bromo - 1-pentyloxy) tetrahydropyran product, b.p. 81° C. at 0.2 mm. of Hg pressure, in a yield of 33 grams (73% of theory).

EXAMPLE 5

2-(5'-bromo-1-pentyloxy) tetrahydropyran

Two milliliters of concentrated hydrochloric acid was added dropwise to a mixture of 73 g. (0.44 mole) of a 5-bromo-1-pentanol and 56 g. (0.67 mole) of dihydropyran while the mixture was maintained at about 0° C. and thereafter stirred at room temperature overnight. 10 grams of anhydrous potassium carbonate was added and the stirring continued for another hour. The resulting mixture was poured into ether and the ether solution washed with 5% sodium hydroxide solution and with brine until the solution was neutral and then was dried over calcium sulfate. The ether was vaporized off under reduced pressure and the residue distilled over potassium carbonate to obtain 80 g. (70% theory) of the desired 2-(5'-bromo-1'-pentyloxy tetrahydropyran boiling from 71° C. and 77° C. at 0.07 mm. of Hg pressure.

EXAMPLE 6

1-cyclopropyl-trans-2-buten-1-ol

A solution of 25 g. (0.2 mole) of cyclopropyl bromide in 50 ml. of dry tetrahydrofuran was added dropwise under gentle reflux conditions, to a reaction mixture initiated by mixing together 4.86 g. (0.2 mole) of magnesium turnings, 20 ml. of dry tetrahydrofuran, a crystal of iodine and 1 g. (0.01 mole) of cyclopropyl bromide. Thereafter, the reaction mixture was heated under reflux for 2 hours to complete the reaction with the formation of cyclopropyl magnesium bromide.

10.8 grams (0.18 mole) of freshly distilled crotonaldehyde in 50 ml. of tetrahydrofuran was added dropwise over a period of about 30 minutes to a cooled (to −20° C.) solution of the above prepared cyclopropyl magnesium bromide in 50 ml. of dry tetrahydrofuran. The mixture was allowed to warm to 0° C. and kept at this temperature for 2 hours to complete the reaction with the formation of the Grignard addition product of crotonaldehyde ad cyclopropyl magnesium bromide.

500 milliliters of cold saturated ammonium chloride solution was added to the Grignard addition product mixture to hydrolyze the addition product. The resulting mixture was then extracted with three 100-milliliter portions of ethyl ether and the ether solution was washed twice with 100-milliliter portions of brine and then dried over magnesium sulfate. The solvent was then vaporized off and the yellow oily residue distilled under vacuum to obtain 10 grams (50% of theory) of the desired 1-cyclopropyl-2-buten-1-ol product, b.p. 68°–70° C. at 0.8 mm. of Hg pressure. At 2 mm. of Hg pressure, 1-cyclopropyl-2-buten-1-ol boiled at 75°–76° C. The 1-cyclopropyl-2-buten-1-ol product had an infra red absorbance band at 965 cm.$^{-1}$ indicating a transethylenic double bond and the product to be 1-cyclopropyl-trans-2-buten-1-ol.

EXAMPLE 7

1-cyclopropyl-trans-2-buten-1-ol

Over a three hour period, dry propyne was bubbled into a mixture of 210 ml. of (0.62 mole) of a 3M ethyl magnesium chloride solution and 400 ml. of dry tetrahydrofuran cooled to −5° C. to obtain a 1-propynyl magnesium chloride Grignard reagent and ethane by-product. The reaction mixture was heated at gentle reflux to drive off the ethane and then cooled to room temperature.

A solution of 25 g. (0.4 mole) of cyclopropyl cyanide in 100 ml. of dry tetrahydrofuran was added dropwise to the above prepared Grignard reagent. The resulting mixture was heated at reflux temperature for 10 hours to obtain a Grignard addition compound of 1-propynyl magnesium chloride and cyclopropyl cyanide.

The reaction mixture was cooled, then 1000 ml. of cold, saturated ammonium chloride solution was added thereto to hydrolyze the addition compound, and the resulting solution was extracted with 500-, 250- and 250-milliliter portions of ether. The organic phases were combined and concentrated to 200 ml. under reduced pressure. The resulting brown solution was stirred together with 300 ml. of aqueous 10% sulfuric acid for 2 hours at about 50° C. whereupon the organic phase became yellow in color. The mixture was cooled, the aqueous phase decanted and extracted with two 100-milliliter portions of ether. The combined organic solutions were washed successively with two 100-milliliter portions of each of water, saturated sodium bicarbonate solution and brine, and then dried over magnesium sulfate. The solvent was removed by vaporization and the resulting orange residue was distilled to obtain a 1-cyclopropyl-2-butyn-1-one intermediate, b.p. 75° C. at 0.2 mm. of Hg pressure.

A solution of 10.8 g. (0.1 mole) of the 1-cyclopropyl-2-butyn-1-ol intermediate in 40 ml. of dry tetrahydrofuran was added dropwise to a cooled solution of 40 ml. (0.1 mole) of a commercial 10.35% lithium aluminum hydride solution. After completion of the addition, the reaction mixture was heated overnight at gently reflux to complete the reaction with the formation of an aluminate reduction product complex. The mixture was then cooled, diluted with 50 ml. of ether, and the ether solution intimately contacted with 30 ml. of a concentrated ammonium chloride solution to hydrolyze the complex. The organic phase was decanted off and the mineral residue washed twice with ether. The combined ether solution was dried over magnesium sulfate, the ether then vaporized off, and the residue distilled to obtain 10 grams (90% of theory) of the desired 1-cyclopropyl-2-buten-1-ol product of b.p. 75°–76° C. at 3 mm. of Hg pressure. The alcohol was determined to have a purity of 96% as determined by GLC. The spectroscopic date corresponding to the product obtained in Example 6 and thus to be 1-cyclopropyl-trans-2-buten-1-ol.

EXAMPLE 8

1-bromo-trans-3, trans-5-heptadiene

Nitrogen was bubbled through 100 ml. of 48% hydrobromic acid cooled to 0° C. and to this solution was poured 17 g. (0.15 mole) of 1-cyclopropyl-trans-2-buten-1-ol in one portion. The heterogeneous mixture was stirred for 15 minutes to thoroughly contact the two phases while cooling to maintain the temperature below 10° C. Thereafter, the reaction mixture was treated with three 100-milliliter portions of n-pentane to recover the organic product. The pentane extract was washed successively with two 100 milliliter portions of each of water, saturated sodium bicarbonate solution and brine, and then dried over magnesium sulfate. The dried solution was subjected to reduced pressure to vaporize off the solvent and the residue distilled to obtain a 1-bromo-3,5-heptadiene product as a colorless liquid, b.p. 73°–75° C. at 7 mm. of Hg pressure. The yield of the 1-bromo-3,5-heptadiene product was 22.1 g. of 85% of theory. The product had infrared absorbance bands at 990 cm.$^{-1}$ indicating trans-trans, and at 950 cm.$^{-1}$ indicating trans-cis. GLC analysis showed the following composition: Trans, trans, 89.9% and trans, cis 9.7%, indicating the product to be substantially 1-bromo-trans-3, trans-5-hepta-diene.

EXAMPLE 9

Tetrahydropyranyl ether of trans - 8, trans - 10 - dodecadien - 1-ol (2-(trans-8, trans-10-dodecadienyl-1-oxy) tetrahydropyran)

1 gram (0.004 mole) of 2-(5'-bromo-1-pentyloxy) tetrahydropyran (prepared as described in Example 4) was added to a mixture of 1.21 g. (0.05 mole) of magnesium turnings, 10 ml. of dry tetrahydrofuran and a crystal of iodine and the resulting mixture stirred until a reaction was initiated. A solution of 11.55 g. (0.046 mole) of 2-(5' bromo-1-pentyloxy)tetrahydropyran in 40 ml. of tetrahydrofuran was added dropwise thereto at a rate to maintain gentle reflux. The reaction mixture was then heated under reflux for 2 hours to obtain a Grignard reagent of 2-(5'-bromo-1- pentyloxy) tetrahydropyran.

A dilithium tetrachlorocuprate solution to be employed in the coupling reaction of the Grignard reagent with 1-bromo-3,5-heptadiene was prepared by causing to react 8.5 g. (0.2 mole) of lithium chloride and 13.4 g. (0.1 mole) of copper (II) chloride in 1000 ml. of dry tetrahydrofuran. The resulting brown solution of the complex was stored under argon at 5° C.

The Grignard reagent prepared as described above was diluted with 50 ml. of dry tetrahydrofuran and transferred to a reaction flask which had been flushed out with argon and there was added thereto a solution of 8.05 g. (0.046 mole) of 1-bromo-3,5-heptadiene (prepared as described in Example 8) in 50 ml. of dry tetrahydrofuran. The resulting mixture was cooled to 0° C. and to it was added 1.5 ml. of the dilithium tetrachlorocuprate solution prepared as described. The mixture was stirred for 4 hours at 0° C. and kept overnight at 5° C. to complete the coupling reaction.

200 milliliters of saturated ammonium chloride solution was added to the above reaction mixture and thereafter, the aqueous phase was extracted with three 100-milliliter portions of ether. The combined organic solution was washed with three 150 milliliter portions of brine and dried over anhydrous magnesium sulfate. The solvent was removed by vaporization at reduced pressure and the residue distilled to obtain the desired tetrahydropyranyl ether product of 8,10-dodecadien-1-ol boiling from 112° to 115° C. at 0.05 mm. of Hg pressure. The tetrahydropyranyl ether product thus obtained had an infrared absorbance band at 987 cm.$^{-1}$ indicating a trans-trans configuration of the double bonds and showing the product to be the tetrahydropyranol ether of trans-8, trans-10-dodecadien-1-ol.

EXAMPLE 10

Trans-8-, trans-10-dodecadien-1-ol 6 grams (0.02 mole) of the pyranyl ether of 8, 10-dodecadien-1-ol (prepared as described in Example 9) and 1 gram of p-toluenesulfonic acid monohydrate were dissolved in 100 ml. of 90% aqueous ethanol and the resulting mixture heated under reflux for 4 hours. Thereafter, the reaction mixture was placed under reduced pressure to vaporize off about one-half of the solvent and the remaining solution was poured into 300 ml. of cold water. The organic phase was extracted with 100-milliliter portions of ethyl ether; thereafter, the extracts were combined and washed with three 150 milliliter portions of brine and dried over anhydrous magnesium sulfate. The solvent was vaporized under reduced pressure and the residue distilled to obtain 3.5 g. (96% yield) of the desired 8,10-dodecadien-1-ol product, b.p. 82°–83° C. at 0.3 mm. of Hg pressure. The product thus obtained had infrared absorbance bands at 985 cm.$^{-1}$ indicating a trans-trans configuration and at 945 cm.$^{-1}$ indicating a trans-cis configuration. GLC analysis showed the following composition: trans, trans, 79.1%; trans, cis, 8.7%; and other isomers 12.2%, showing the liquid product to be primarily trans-8, trans-10-dodecadien-1-ol. On cooling to 5° C. trans-8, trans-10-dodecadien-1-ol crystallized and when recrystallized from pentane or aqueous methanol had a melting point of 29–30° C.

EXAMPLE 11

Tetrahydropyranol ether of trans-8, trans-10-dodecadien-1-ol 1 gram (0.004 mole) of 1-bromo-3,5-heptadiene, prepared as previously described, was added to a mixture of 1.21 g. (0.05 mole) of magnesium, 10 ml. of dry tetrahydrofuran and crystal of iodine wherepon a reaction started immediately. The remaining 7.75 g. (0.046 mole) of 1-bromo-3,5-heptadiene dissolved in 40 ml. of tetrahydrofuran was added dropwise to the mixture at a rate to maintain gentle reflux. Thereafter, the mixture was heated at reflux temperature for 2 hours to complete the reaction with the formation of the Grignard reagent of 1-bromo-3,5-heptadiene.

A solution of 11.5 g. (0.046 mole) of 2-(5'-bromo-1-pentyloxy) tetrahydropyran in 50 ml. of tetrahydrofuran was added to a cooled solution of the above prepared Grignard reagent in 50 ml. of tetrahydrofuran in a vessel previously flushed with argon and the resulting mixture was cooled to 0° C. 1.5 milliliters of a tetrahydrofuran solution of dilithium tetrachlorocuprate which had been prepared as described in Example 9 was added thereto and the resulting mixture stirred at 0° C. for 4 hours and then allowed to stand at 5° C. overnight to complete the coupling reaction.

200 milliliters of saturated ammonium chloride solution was added to the reaction mixture and thereafter, the aqueous phase was extracted with three 100-milliliter portions of ethyl ether. The combined organic solution was washed with three 150-milliliter portions of brine and dried over anhydrous magnesium sulfate. The solvent was vaporized off under reduced pressure and the residue distilled to obtain 7.42 g. (60% yield) of the desired tetrahydropyranyl ether product of 8,10-dodecadien-1-ol boiling from 112° to 116° at 0.05 mm. of Hg pressure. The ether product thus obtained had an infrared absorbance band at 987 cm.$^{-1}$ indicating a trans-trans configuration of the double bonds and showing the product to be the tetrahydropyranyl ether of trans-8, trans-10-dodecadien-1-ol.

EXAMPLE 12

Trans-8, trans-10-dodecadien-1-ol 1.0 gram (0.004 mole) of the tetrahydropyranyl ether of trans-8, trans-10-dodecadien-1-ol in 30 ml. of methanol is stirred together with 12 ml. of water and 1.5 gram of p-toluene-sulfonic acid for 3 hours at room temperature to obtain trans-8, trans-10-dodecadien-1-ol which is recovered from the reaction mixture in the manner described in Example 10.

EXAMPLE 13

5-bromo-1-pentyloxytrimethylsilane 10.8 grams (0.10 mole) of trimethylchlorosilane and 16.7 g. (0.10 mole) of 5-bromo-1-pentanol are mixed together in 100 ml. of dry benzene and stirred in an ice bath while anhydrous ammonia is passed therethrough until the odor of ammonia persists to obtain 5-bromo-1-pentyloxytrimethylsilane.

This compound may be used in place of 2-(5'-bromo-1-pentyloxy) tetrahydropyran.

EXAMPLE 14

To a mixture of 8 ml. of acetic acid and 4 ml. of water was added one gram of the tetrahydropyranyl ether of 8,10-dodecadien-1-ol. The resulting heterogeneous mixture was stirred overnight at room temperature to yield 0.5 g. of 8,10-dodecadien-1-ol, which crystallized at room temperature.

EXAMPLE 15

A mixture of 50 g. of acetyl chloride, 60 g. of tetrahydropyran (previously dried) and 10 g. of fresh and coarsely ground zinc chloride was heated at about 80° C. for one hour on an oil bath. The mixture was cooled, diluted with 150 ml. of benzene and shaken first with 100 ml. of cold water and then with 100 ml. of cold saturated solution of sodium bicarbonate until carbon dioxide was no longer evolved. The benzene layer was dried over sodium sulfate and fractionally distilled to yield 5-chloro - 1 - acetoxypentane, boiling point 98–99° C., 10 mm. Hg.

70 Grams of the 5-chloro-1-acetoxypentane in 170 ml. of ethanol was shaken with 220 ml. of 2N sodium hydroxide until homogeneous and then allowed to stand two days at room temperature. Alcohol was removed by evaporation under reduced pressure and the residue taken up in benzene, which is distilled to yield 5-chloro-1-pentanol, boiling point 52–53.5° C. at 0.6 mm. Hg.

Following the procedure of Example 4, 2-(5-chloro-1-pentyloxy)tetrahydropyran, boiling point 69–72° at 0.6 mm. Hg was prepared from 5-chloro-1-pentanol (0.25 mole) and dihydropyran (0.3 mole).

The Grignard of 2-(5-chloro-1-pentyloxy)tetrahydropyran was prepared from 31 g. of the chloro-pyranyl ether and 3.7 g. of magnesium turnings in 150 ml. of dry tetrahydrofuran. The Grignard was diluted with 150 ml. of dry tetrahydrofuran and then 21 g. of 1-bromo-3,5-heptadiene in 150 ml. of dry tetrahydrofuran was added. After cooling to 0°, 5 ml. of dilithium tetrachlorocuprate (prepared from 0.02 mole of lithium chloride and 0.01 mole of copper (II) chloride in 100 ml. of tetrahydrofuran) was added. The reaction was complete after about five hours. Hydrolysis was accomplished by addition of 500 ml. of saturated ammonium chloride. After drying over magnesium sulfate and evaporation of solvent, the residue was filtered through alumina column using hexane. Distillation provided the tetrahydropyranyl ether of 8,10-dodecadien-1-ol, boiling point of 117–120° C. at 0.07 Hg.

Three grams of the above tetrahydropyranyl ether, 7 ml. of 70% perchloric acid, 23 ml. of water and 70 ml. of tetrahydrofuran was stirred two days at room temperature to yield the alcohol, 8,10-dodecadien-1-ol, identical to the product of Example 10.

EXAMPLE 16

33.4 Grams of pentamethylenebromhydrin was cooled and maintained less than 20° C. Trimethylchlorosilane (0.2 ml.) was added, under nitrogen, followed by 16.2 g. of hexamethyldisilazane. When addition was complete, 4 ml. of hexamethyldisilazane was added and the mixture filtered. The filtrate was distilled to give 1-trimethylsilyloxy-5-bromopentane, b.p. 80–82° C. at 7 mm. Hg. The Grignard was prepared and reacted with 1-bromo-3,5-heptadiene using the method of Example 15 to yield the trimethylsilyl ether of 8,10-dodecadien-1-ol.

What is claimed is:

1. 1-Bromo-trans-3, trans-5-heptadiene.

References Cited

FOREIGN PATENTS 884,638   12/1961   Great Britain _____ 260—654 R

LEON ZITVER, Primary Examiner

J. A. BOSKA, Assistant Examiner

U.S. Cl. X.R.

260—345.9, 347.9, 448.3 R, 496, 586 R, 611 A, 614 R, 617 R, 617 E, 632 R, 632 B, 633, 665 G; 424—343

UNITED STATES PATENT OFFICE
CERTIFICATE OF CORRECTION

Patent No. 3,825,607     Dated July 23, 1974

Inventor(s) Clive A. Henrick and Charles E. Descoins

It is certified that error appears in the above-identified patent and that said Letters Patent are hereby corrected as shown below:

Column 10, Formula IX should read:

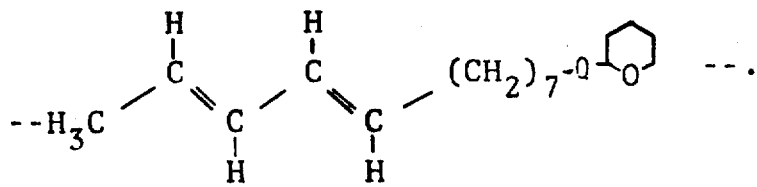

Signed and Sealed this twenty-second Day of July 1975

[SEAL]

Attest:

RUTH C. MASON
*Attesting Officer*

C. MARSHALL DANN
*Commissioner of Patents and Trademarks*